(12) United States Patent
Hosoi et al.

(10) Patent No.: US 10,991,958 B2
(45) Date of Patent: Apr. 27, 2021

(54) GAS AND WATER DISCHARGE UNIT FOR FUEL CELL SYSTEM

(71) Applicants: TOYOTA JIDOSHA KABUSHIKI KAISHA, Toyota (JP); AISIN SEIKI KABUSHIKI KAISHA, Kariya (JP)

(72) Inventors: Takami Hosoi, Toyota (JP); Hiroaki Nishiumi, Toyota (JP); Takashi Mishima, Toyota (JP); Koichi Kashiwagi, Toyokawa (JP); Hitoshi Okuno, Chiryu (JP)

(73) Assignees: TOYOTA JIDOSHA KABUSHIKI KAISHA, Toyota (JP); AISIN SEIKI KABUSHIKI KAISHA, Kariya (JP)

( * ) Notice: Subject to any disclaimer, the term of this patent is extended or adjusted under 35 U.S.C. 154(b) by 207 days.

(21) Appl. No.: 16/410,343

(22) Filed: May 13, 2019

(65) Prior Publication Data
US 2019/0363375 A1    Nov. 28, 2019

(30) Foreign Application Priority Data
May 25, 2018   (JP) .............................. JP2018-100350

(51) Int. Cl.
| | |
|---|---|
| H01M 8/04007 | (2016.01) |
| H01M 8/04119 | (2016.01) |
| H01M 8/1004 | (2016.01) |
| H01M 8/24 | (2016.01) |
| H01M 8/04089 | (2016.01) |
| H01M 8/04223 | (2016.01) |

(52) U.S. Cl.
CPC ... *H01M 8/04007* (2013.01); *H01M 8/04097* (2013.01); *H01M 8/04164* (2013.01); *H01M 8/04253* (2013.01); *H01M 8/1004* (2013.01); *H01M 8/24* (2013.01)

(58) Field of Classification Search
None
See application file for complete search history.

(56) References Cited

U.S. PATENT DOCUMENTS

2006/0063049 A1*  3/2006  Fujita .................. H01M 8/2457
                                                            429/414
2010/0112404 A1   5/2010  Yamagishi et al.

FOREIGN PATENT DOCUMENTS

JP        2008-243722 A     10/2008

\* cited by examiner

*Primary Examiner* — Wojciech Haske
(74) *Attorney, Agent, or Firm* — Oliff PLC

(57) ABSTRACT

A gas and water discharge unit for a fuel cell system that can be prevented from freezing even when it is formed using resin material. The unit includes a gas-liquid separator for separating produced water from fuel off-gas discharged from a fuel cell device, a gas and water discharge valve disposed downstream of the gas-liquid separator, and a resin unit body integrally formed with the gas-liquid separator and the gas and water discharge valve, in which the inside of the unit body includes a first channel with a valve seal at an end thereof on the gas and water discharge valve side, the first channel allowing communication between the gas-liquid separator and the gas and water discharge valve, a second channel communicating with the first channel via the gas and water discharge valve, and a heated water channel surrounding at least one of the first or second channel.

3 Claims, 3 Drawing Sheets

GAS AND WATER DISCHARGE UNIT FOR FUEL CELL SYSTEM

CROSS REFERENCE TO RELATED APPLICATIONS

The present application claims priority from Japanese patent application JP 2018-100350 filed on May 25, 2018, the content of which is hereby incorporated by reference into this application.

BACKGROUND

Technical Field

The present disclosure relates to a gas and water discharge unit for a fuel cell system.

Background Art

There has been known a fuel cell system that includes a fuel cell device having a plurality of stacked fuel cells, a fuel gas supply channel adapted to supply a fuel gas such as hydrogen to the fuel cell device, and a circulation channel adapted to reflux a fuel off-gas that has been discharged from the fuel cell device to the fuel gas supply channel. In the fuel cell system with such a structure, the fuel off-gas contains water produced through electrochemical reactions in the fuel cell device. Therefore, a gas and water discharge unit is used for removal of the produced water, the unit including a gas-liquid separator to separate the produced water from the fuel off-gas and a gas and water discharge valve to discharge the separated water to the outside.

Examples of such a gas and water discharge unit include the one described in JP 2008-243722 A, in which a valve body of a gas and water discharge valve and a gas-liquid separator are separately provided. In such a gas and water discharge unit, the valve body is made of metal, and the metal valve body is provided with a refrigerant channel passing therethrough, so that the valve body is heated with the heat of a refrigerant flowing through the refrigerant channel, for preventing the gas and water discharge unit from freezing due to remaining produced water when the temperature becomes below zero degrees Celsius.

SUMMARY

In this type of gas and water discharge unit, it has been considered to integrally form the gas and water discharge valve and the gas-liquid separator using a resin material, for reducing the cost and size of the unit. However, since such an integral resin structure of the valve body of the gas and water discharge valve and gas-liquid separator has lower heat conductivity than those made of a metal material, a problem would arise in that the gas and water discharge unit cannot be prevented from freezing.

The present disclosure has been made in view of the foregoing, and provides a gas and water discharge unit for a fuel cell system that can be prevented from freezing even when the unit is formed using a resin material.

The gas and water discharge unit for a fuel cell system according to the present disclosure includes a gas-liquid separator adapted to separate produced water from a fuel off-gas discharged from a fuel cell device, a gas and water discharge valve disposed downstream of the gas-liquid separator, and a unit body made of resin, the unit body being integrally formed with the gas-liquid separator and the gas and water discharge valve, in which the inside of the unit body includes a first channel, a second channel, and a heated water channel, the first channel being configured to allow communication between the gas-liquid separator and the gas and water discharge valve and being provided with a valve seat at an end thereof on the side of the gas and water discharge valve, the second channel being configured to communicate with the first channel via the gas and water discharge valve, and the heated water channel being configured to surround at least one of the first channel or the second channel.

In the gas and water discharge unit for a fuel cell system according to the present disclosure, since the first channel, second channel, and heated water channel that surrounds at least one of the first channel or second channel are provided inside the unit body, the first channel and/or second channel can be heated with heated water flowing through the heated water channel, so that the gas and water discharge unit can be prevented from freezing due to the remaining produced water when the temperature becomes below zero degrees Celsius. Thus, the gas and water discharge unit can be prevented from freezing even when it is formed using a resin material. Moreover, cost reduction can be realized with the unit body made of a resin material.

In some embodiments of the gas and water discharge unit for a fuel cell system according to the present disclosure, the center line of the second channel is offset from that of the first channel, and the heated water channel is provided such that it surrounds each of the first and second channels. Such a structure allows for larger heat exchange areas between the heated water channel and each of the first and second channels, so that the first and second channels can be efficiently heated, thereby enhancing the advantageous effect of preventing the gas and water discharge unit from freezing.

In some embodiments of the gas and water discharge unit for a fuel cell system according to the present disclosure, the gas and water discharge valve is disposed such that its axis extends in the lateral direction. Such a structure allows the overall height of the gas and water discharge unit to be reduced, so that a compact gas and water discharge unit can be realized.

According to the present disclosure, the gas and water discharge unit can be prevented from freezing even when it is formed using a resin material.

DETAILED DESCRIPTION

An embodiment of a gas and water discharge unit for a fuel cell system (hereinafter, the "gas and water discharge unit for a fuel cell system" shall be abbreviated as a "gas and water discharge unit") according to the present disclosure will be described below with reference to the drawings. Prior to the description, the structure of a fuel cell system to which the gas and water discharge unit is applied will be described with reference to FIG. 1. It should be noted that the fuel cell system may be used as a drive source for vehicles, vessels, aircrafts, trains, and the like, or as a power generation facility of buildings. Herein, an example of the fuel cell system mounted on a vehicle and used as a drive source therefor will be described.

Figure 1:
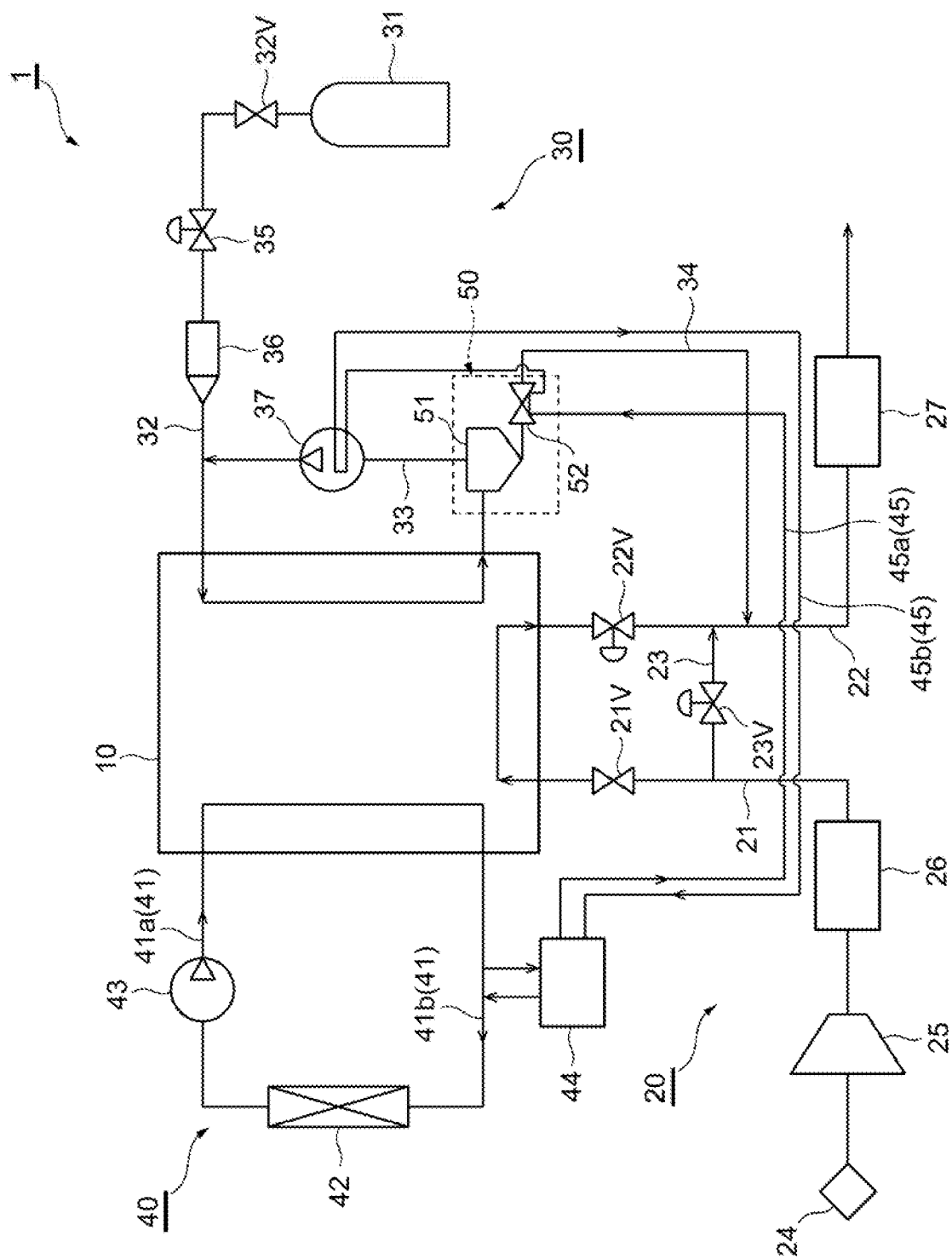
FIG. 1 is a schematic configuration diagram of a fuel cell system with a gas and water discharge unit.

FIG. 1 is a schematic configuration diagram of a fuel cell system with a gas and water discharge unit. As shown in FIG. 1, the fuel cell system 1 mainly includes a fuel cell device 10, an oxidant gas supply system 20 adapted to supply an oxidant gas such as air to the fuel cell device 10, a fuel gas supply system 30 adapted to supply a fuel gas such as hydrogen to the fuel cell device 10, and a refrigerant supply system 40 adapted to supply a refrigerant to the fuel cell device 10.

The fuel cell device 10 is a cell stack of a plurality of stacked fuel cells and is a polymer electrolyte fuel cell. Though not shown, each fuel cell has a membrane electrode assembly (MEA) including an ion-permeable electrolyte membrane, and a catalyst layer on the anode side (or an anode electrode) and a catalyst layer on the cathode side (or a cathode electrode) sandwiching the electrolyte membrane, for example. Each fuel cell further includes a pair of separators (that is, separators on the anode and cathode sides) sandwiching the MEA.

Further, gas diffusion layers (GDLs), which are adapted to supply a fuel gas or an oxidant gas to the fuel cells and also to collect electricity generated through electrochemical reactions in the fuel cells, may occasionally be formed on the opposite sides of the MEA. Such an MEA with the GDLs disposed on the opposite sides thereof is referred to as a membrane electrode and gas diffusion layer assembly (MEGA). The MEGA is further sandwiched between the aforementioned separators on the anode and cathode sides.

The oxidant gas supply system 20 includes, for example, an oxidant gas supply channel 21 adapted to supply an oxidant gas to the cathode electrodes of the fuel cell device 10, an oxidant gas discharge channel 22 adapted to discharge, from the fuel cell device 10, an oxidant off-gas (that is, an unconsumed oxidant gas) produced after the oxidant gas is used for electrochemical reactions in the fuel cells, and a bypass channel 23 adapted to circulate the oxidant gas to the oxidant gas discharge channel 22 by bypassing the fuel cell device 10. The oxidant gas supply channel 21, oxidant gas discharge channel 22, and bypass channel 23 are each made of, for example, a hose, tube, pipe, or joint member.

The oxidant gas supply channel 21 is provided with an air cleaner 24, air compressor 25, intercooler 26, and the like in this order from the upstream side. Meanwhile, the oxidant gas discharge channel 22 is provided with a muffler 27 and the like. It should be noted that the air cleaner 24 of the oxidant gas supply channel 21 is provided with, for example, a pressure sensor and air flow meter, though not shown.

The air cleaner 24 is adapted to remove dust in the air taken in from the outside. The air compressor 25 is adapted to compress the oxidant gas introduced via the air cleaner 24 and then supply the compressed oxidant gas to the intercooler 26. The intercooler 26 is adapted to cool the oxidant gas supplied from the air compressor 25 and passing therethrough by exchanging heat with the refrigerant, for example, and further supply the cooled oxidant gas to the cathode electrodes of the fuel cell device 10.

Further, the oxidant gas supply channel 21 is provided with an inlet valve 21V for blocking the flow of an oxidant gas between the intercooler 26 and fuel cell device 10. The inlet valve 21V is a check valve that is configured to open by the flow of the oxidant gas moving from the intercooler 26 toward the fuel cell device 10 and thus allow the passage of the oxidant gas, and to close by the flow of the oxidant gas moving from the fuel cell device 10 toward the intercooler 26 and thus block the passage of the oxidant gas.

The bypass channel 23 is connected at one end to the oxidant gas supply channel 21 at a point downstream of the intercooler 26, and is connected at the other end to the oxidant gas discharge channel 22. In other words, the bypass channel 23 branches from the oxidant gas supply channel 21 at a point downstream of the intercooler 26, and is directed toward and connected to the oxidant gas discharge channel 22. In the bypass channel 23, the oxidant gas that is supplied from the air compressor 25, cooled by the intercooler 26, and then discharged from the intercooler 26 flows toward the oxidant gas discharge channel 22 by bypassing the fuel cell device 10. The bypass channel 23 is provided with a bypass valve 23V for regulating the flow rate of the oxidant gas flowing through the bypass channel 23.

In the oxidant gas discharge channel 22, the muffler 27 separates the oxidant off-gas flowing through the oxidant gas discharge channel 22 into, for example, gas and liquid phases and discharge the separated oxidant off-gas to the outside. Further, the oxidant gas discharge channel 22 is provided with a pressure regulating valve 22V for regulating the back pressure of the oxidant gas supplied to the fuel cell device 10. The aforementioned bypass channel 23 is connected to the oxidant gas discharge channel 22 at a point downstream of the pressure regulating valve 22V.

Meanwhile, a fuel gas supply system 30 includes, for example, a fuel gas tank 31 that stores a high-pressure fuel gas such as hydrogen, a fuel gas supply channel 32 adapted to supply the fuel gas supplied from the fuel gas tank 31 to the anode electrodes of the fuel cell device 10, a circulation channel 33 adapted to reflux a fuel off-gas (that is, an unconsumed fuel gas) discharged from the fuel cell device 10 to the fuel gas supply channel 32, and a discharge channel 34 that branches from the circulation channel 33 via a gas-liquid separator 51 (which will be described later). The fuel gas supply channel 32, circulation channel 33, and discharge channel 34 are each made of, for example, a hose, tube, pipe, or joint member.

The fuel gas supply channel 32 is provided with a shut-off valve 32V for opening and closing the fuel gas supply channel 32, a regulator 35 for regulating the pressure of the fuel gas flowing through the fuel gas supply channel 32, and an injector 36 for supplying the fuel gas with its pressure regulated to the fuel cell device 10. When the shut-off valve 32V is opened, the high-pressure fuel gas stored in the fuel gas tank 31 flows out to the fuel gas supply channel 32, and is supplied to the anode electrodes of the fuel cell device 10 with its pressure reduced by the regulator 35 and injector 36.

The circulation channel 33 is provided with a gas and water discharge unit 50 including a gas-liquid separator 51, gas and water discharge valve 52, and the like, and a hydrogen circulation pump 37 that are arranged in this order from the upstream side (that is, the side of the fuel cell device 10). The gas-liquid separator 51 connected to the circulation channel 33 is adapted to separate produced water from the fuel off-gas flowing through the circulation channel 33 and then store the separated water, while sending the fuel off-gas after the gas-liquid separation to the side of the hydrogen circulation pump 37. The hydrogen circulation pump 37 pressurizes the fuel off-gas after the gas-liquid separation by the gas-liquid separator 51 and then circulates the pressurized fuel off-gas to the fuel gas supply channel 32.

The discharge channel 34 is disposed downstream of the gas and water discharge unit 50, The discharge channel 34 is connected at one end to a secondary water discharge channel 532 (which will be described later) of the gas and water discharge unit 50, and is connected at the other end to the oxidant gas discharge channel 22.

Meanwhile, the refrigerant supply system 40 includes, for example, a refrigerant circulation channel 41 adapted to circulate a refrigerant between a radiator 42 and the fuel cell device 10, and a water pump 43 provided in the refrigerant circulation channel 41. The water pump 43, disposed in a refrigerant circulation forward path 41a of the refrigerant circulation channel 41, is adapted to pressurize the refrigerant and then supply the pressurized refrigerant to the fuel cell device 10. Examples of the refrigerant to be used include water containing ethylene glycol. Further, the refrigerant flowing through the refrigerant circulation channel 41 absorbs the heat generated through the electrochemical reactions in the fuel cells while passing through the fuel cell device 10 and thus is heated, and is then cooled by releasing the heat while passing through the radiator 42.

Further, an air conditioning heater 44 is connected to a refrigerant circulation return path 41b of the refrigerant circulation channel 41.

In the fuel cell system 1 with the aforementioned configuration, the fuel cell device 10 generates electricity through electrochemical reactions between the oxidant gas supplied from the oxidant gas supply system 20 to the cathode electrodes and the fuel gas supplied from the fuel gas supply system 30 to the anode electrodes. Then, water is produced (that is, produced water) on the cathode electrodes along with the electrochemical reactions. The most part of the produced water is discharged from the side of the cathode electrodes, while some part thereof moves to the side of the anode electrodes through the electrolyte membrane and then becomes mixed with the fuel off-gas. The produced water that has been mixed with the fuel off-gas (in other words, produced water contained in the fuel off-gas) is separated from the fuel off-gas by the aforementioned gas-liquid separator 51.

Further, in the fuel cell device 10, part of oxidant gas on the side of the cathode electrodes moves to the side of the anode electrodes through the electrolyte membrane due to the pressure difference between the cathode and anode electrodes. Therefore, nitrogen gas contained in the oxidant gas is mixed with the fuel off-gas, and is refluxed to the fuel gas supply channel 32 via the circulation channel 33 together with the fuel off-gas, and is then supplied to the fuel cell device 10. Further, if the concentration of the nitrogen flowing through the fuel cell device 10 increases, the electricity generation performance of the fuel cell device 10 would deteriorate. Therefore, the nitrogen should be periodically discharged to the outside together with the fuel off-gas. Thus, in the fuel cell system 1, the gas and water discharge valve 52 also functions as a gas discharge valve for discharging the fuel off-gas and nitrogen as well as a water discharge valve for discharging the produced water, so that the fuel off-gas and nitrogen are periodically discharged to the outside via the gas and water discharge valve 52.

Figure 2:
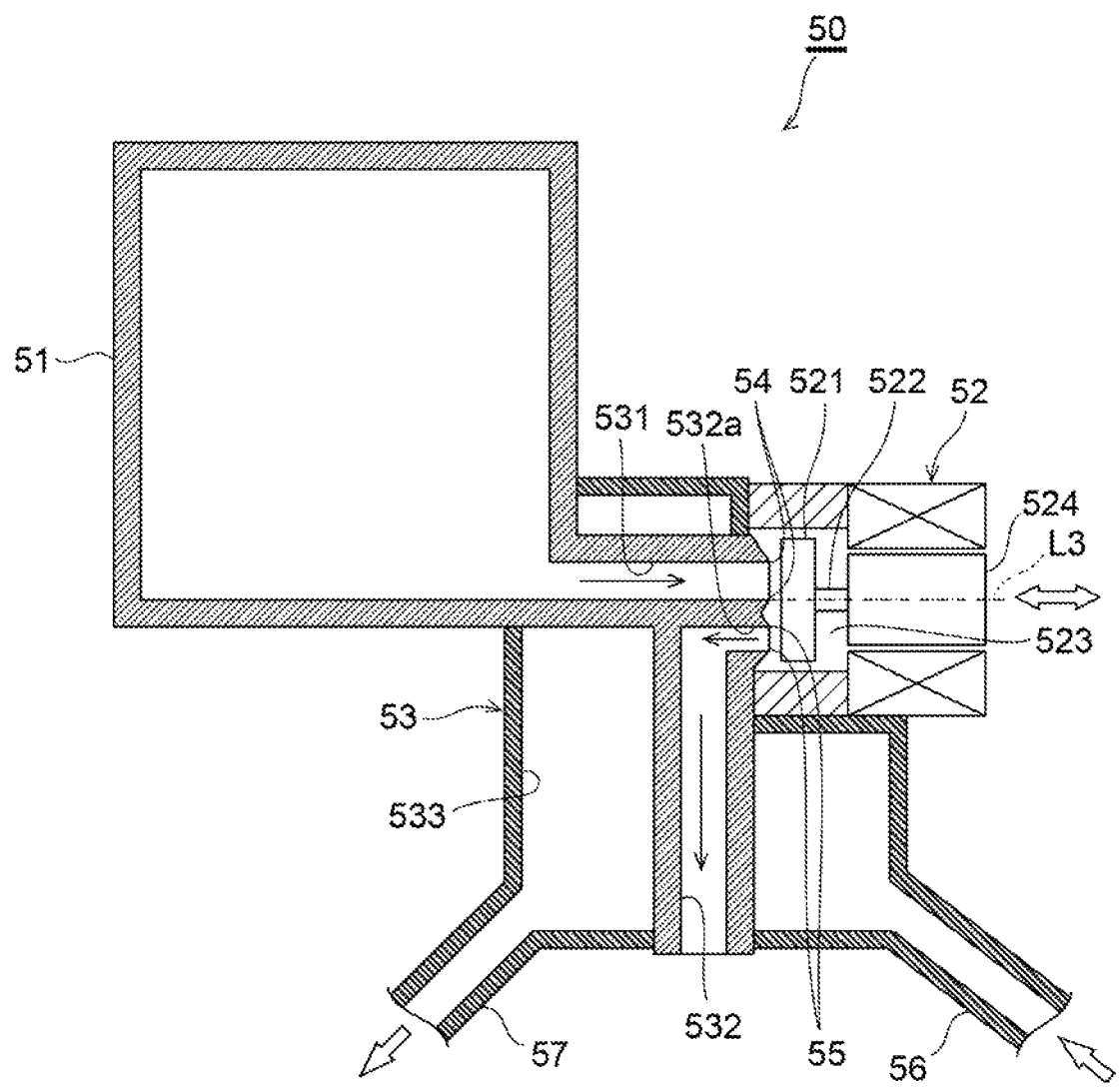
FIG. 2 is a schematic longitudinal sectional view of the gas and water discharge unit.
Figure 3:
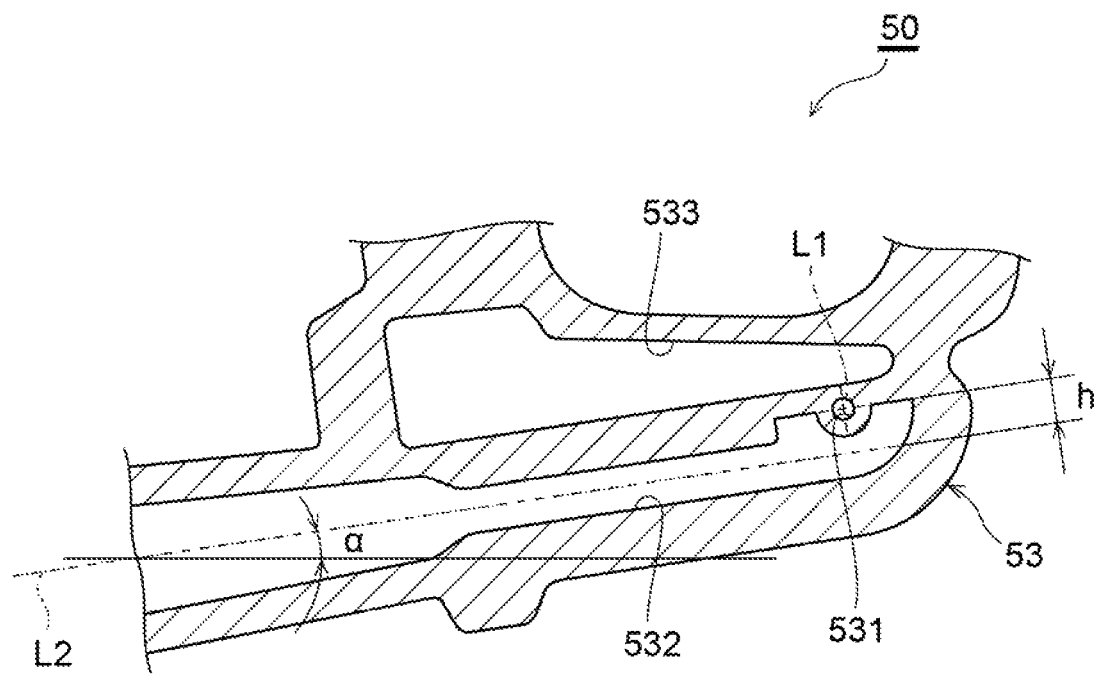
FIG. 3 is a schematic longitudinal sectional view of a heated water channel, primary water discharge channel, and secondary water discharge channel inside the gas and water discharge unit.
Figure 4:
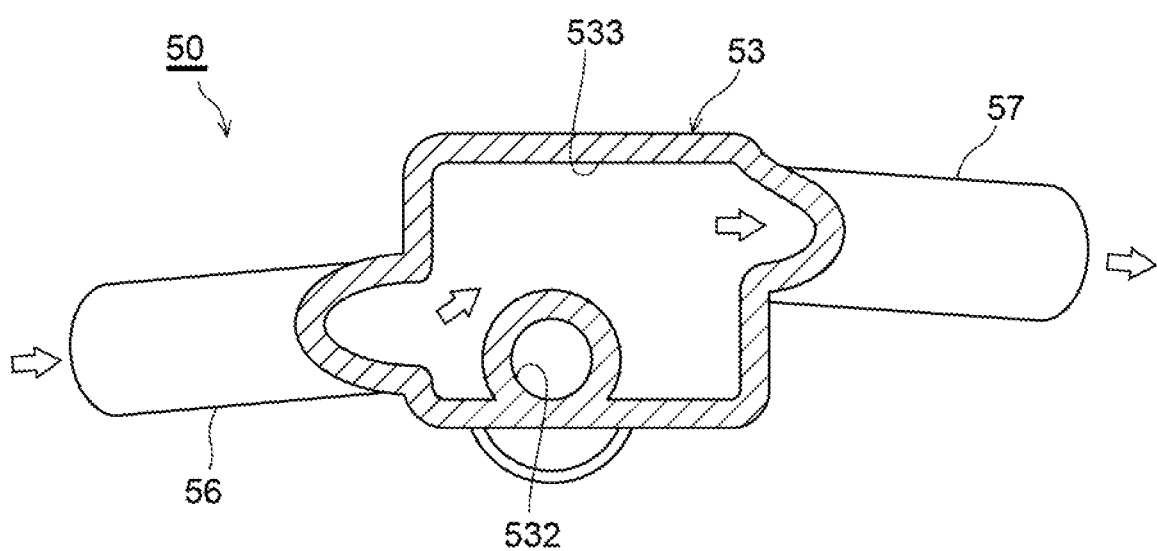
FIG. 4 is a schematic transverse sectional view of the heated water channel and secondary water discharge channel inside the gas and water discharge unit.

The configuration of the aforementioned gas and water discharge unit 50 will be detailed below with reference to FIGS. 2 to 4. FIG. 2 is a schematic longitudinal sectional view of the gas and water discharge unit; FIG. 3 is a schematic longitudinal sectional view of a heated water channel, primary water discharge channel, and secondary water discharge channel inside the gas and water discharge unit; and FIG. 4 is a schematic transverse sectional view of the heated water channel and secondary water discharge channel inside the gas and water discharge unit. The gas and water discharge unit 50 includes the aforementioned gas-liquid separator 51, the aforementioned gas and water discharge valve 52 disposed downstream of the gas-liquid separator 51, and a unit body 53 made of resin and integrally formed with the gas-liquid separator 51 and the gas and water discharge valve 52.

The gas and water discharge valve 52, which is an electromagnetic on-off valve, includes a valve chamber 523, a rubber valve body 521 disposed inside the valve chamber 523, a valve shaft 522 to which the valve body 521 is secured, and an actuator 524 for reciprocating the valve shaft 522 with a predetermined stroke. As shown in FIG. 2, the gas and water discharge valve 52 is disposed such that its axis L3 extends in the lateral direction. The valve body 521 is driven by the actuator 524 to reciprocate along the axis L3, such that it can move into contact with or away from valve seats 54 and 55. It should be noted that the term "lateral" herein refers to the left-right or the front-back direction of a vehicle.

The unit body 53 is integrally attached to the gas-liquid separator 51 and the gas and water discharge valve 52 so as to couple them. The unit body 53 may be formed as a single component through resin-molding or be assembled from a plurality of components that have been separately produced.

The unit body 53 is formed using, for example, a hard resin material such that it has a plurality of hollows in the inside thereof. Examples of the resin material include polycarbonate, polypropylene, polyimide, polystyrene, and polyethylene. As shown in FIG. 2, the inside of the unit body 53 is provided with a hollow primary water discharge channel (first channel) 531 disposed downstream of the gas-liquid separator 51, the hollow secondary water discharge channel (second channel) 532 disposed downstream of the gas and water discharge valve 52, and a hollow heated water channel 533 disposed such that it surrounds the primary water discharge channel 531 and secondary water discharge channel 532.

The primary water discharge channel 531 is in a cylindrical shape, for example, and extends in the lateral direction between the gas-liquid separator 51 and the gas and water discharge valve 52 so as to allow their communication. One end of the primary water discharge channel 531 on the side of the gas-liquid separator 51 is connected to the bottom of the gas-liquid separator 51, and the other end on the side of the gas and water discharge valve 52 to the valve chamber 523 of the gas and water discharge valve 52. Further, the other end of the primary water discharge channel 531 on the side of the gas and water discharge valve 52 is provided with the valve seat 54 where the valve body 521 of the gas and water discharge valve 52 can be seated.

The secondary water discharge channel 532 is in a cylindrical shape with a step (see FIG. 3), for example, and communicates with the primary water discharge channel 531 via the gas and water discharge valve 52. More specifically, the secondary water discharge channel 532 communicates with the valve chamber 523 of the gas and water discharge valve 52 via a direction conversion channel 532a that forms an end of the secondary water discharge channel 532. The direction conversion channel 532a is disposed in parallel with the extending direction of the primary water discharge channel 531 and is provided at an end thereof with the valve seat 55 where the valve body 521 can be seated. Further, the other end of the secondary water discharge channel 532 on the side opposite to the side of the direction conversion channel 532a communicates with the aforementioned discharge channel 34.

In the present embodiment, the valve seat 54 and the valve seat 55 respectively provided at the ends of the primary water discharge channel 531 and the direction conversion channel 532a are disposed at the same distance from the valve body 521 so that the valve body 521 of the gas and water discharge valve 52 can be simultaneously seated on both the valve seats 54 and 55. That is, when the valve body 521 abuts and is seated on the valve seat 54 provided at the end of the primary water discharge channel 531, it is also simultaneously sealed on the valve seat 55 provided at the end of the direction conversion channel 532a, thereby simultaneously closing the primary water discharge channel 531 and secondary water discharge channel 532. Meanwhile, when the valve body 521 moves away from the valve seats 54 and 55, the primary water discharge channel 531 and secondary water discharge channel 532 are simultaneously opened.

Further, when the primary water discharge channel 531 and secondary water discharge channel 532 are simultaneously opened (that is, when the gas and water discharge valve 52 is opened), produced water inside the gas-liquid separator 51 flows through the primary water discharge channel 531, valve chamber 523, and direction conversion channel 532a in this order, and then flows into the secondary water discharge channel 532, as indicated by arrows in FIG. 2.

Meanwhile, the heated water channel 533 is disposed such that it surrounds each of the primary water discharge channel 531 and secondary water discharge channel 532. The heated water channel 533 is formed, for example, such that it hollows out a portion between the primary water discharge channel 531 and secondary water discharge channel 532, and has an irregular shape so as to secure larger contact areas (in other words, heat exchange areas) between the heated water channel 533 and each of the primary water discharge channel 531 and secondary water discharge channel 532.

The unit body 53 further includes a heated water inlet tube 56 and a heated water outlet tube 57 that project outward of the unit body 53. The heated water inlet tube 56 and heated water outlet tube 57 are each connected to the heated water channel 533. Therefore, as indicated by outlined arrows in FIGS. 2 and 4, heated water flows into the heated water channel 533 via the heated water inlet tube 56, and flows around the primary water discharge channel 531 and secondary water discharge channel 532 while heating these channels, and then flows to the outside via the heated water outlet tube 57.

The heated water flowing through the heated water channel 533 is supplied through a heated water circulation channel 45 provided between the gas and water discharge unit 50 and the aforementioned air conditioning heater 44 (see FIG. 1). The heated water inlet tube 56 and the heated water outlet tube 57 are respectively connected to a heated water circulation forward-path 45a and a heated water circulation return-path 45b of the heated water circulation channel 45.

Herein, the heated water circulation return-path 45b may be configured such that it further passes through the hydrogen circulation pump 37 and then returns to the air conditioning heater 44 (see FIG. 1). With such a configuration, the hydrogen circulation pump 37 can also be heated, thereby providing the advantageous effect of preventing condensation in the hydrogen circulation pump 37.

Further, in the present embodiment, for preventing the secondary water discharge channel 532 and the like from freezing due to remaining produced water when the temperature becomes below zero degrees Celsius, the secondary water discharge channel 532 is disposed inclined relative to the horizontal direction. Specifically, as shown in FIG. 3, the secondary water discharge channel 532 is disposed such dial it descends toward the rear relative to the horizontal direction. Further, an inclination angle α relative to the horizontal direction may be set around 10 degrees because of the following reason.

Vehicles may occasionally be designed to have an inclination angle of about 9 degrees and about 8 degrees in the longitudinal direction and in the lateral direction of the vehicles, respectively, relative to the road surface when parked, considering cases in which vehicles are parked with their front down in cold regions. Therefore, if vehicles have the inclination angle α of about 10 degrees, they can maintain the secondary water discharge channel 532 inclined relative to the horizontal direction (herein, inclined at one degree) even when parked with their front down with the maximum inclination angle (that is, 9 degrees) when parked. Thus, the produced water can be discharged to the outside without remaining in the secondary water discharge channel 532.

Further, in the present embodiment, the center line L2 of the secondary water discharge channel 532 is offset from the center line L1 of the primary water discharge channel 531. Specifically, as shown in FIG. 3, the center line L1 of the primary water discharge channel 531 is positioned above the center line L2 of the secondary water discharge channel 532 by a predetermined distance h (also referred to as an offset amount h) in the height direction (that is, the height direction of a vehicle).

In the gas and water discharge unit 50 with the aforementioned configuration, since the inside of the unit body 53 is provided with the primary water discharge channel 531, secondary water discharge channel 532, and the heated water channel 533 that surrounds the primary water discharge channel 531 and secondary water discharge channel 532, the primary water discharge channel 531 and secondary water discharge channel 532 can be effectively heated with the heated water flowing through the heated water channel 533. Therefore, freezing of the primary water discharge channel 531 and secondary water discharge channel 532 can be suppressed, thereby being able to prevent the gas and water discharge unit 50 from freezing due to the remaining produced water when the temperature becomes below zero degrees Celsius. Thus, the gas and water discharge unit 50 can be prevented from freezing even when it is formed using a resin material. Moreover, cost reduction can be realized with the unit body 53 made of a resin material as compared with those made of metal.

Further, since the center line L2 of the secondary water discharge channel 532 is onset from the center line L1 of the primary water discharge channel 531 in the height direction, larger heat exchange areas between the heated water channel 533 and each of the primary water discharge channel 531 and secondary water discharge channel 532 can be secured, so that a higher advantageous effect of preventing the freezing of the gas and water discharge unit 50 can be obtained. In particular, the distance between the heated water channel 533 and the primary water discharge channel 531, inter alia, the distance between the heated water channel 533 and the valve seat 54 provided at the end of the primary water discharge channel 531 can be reduced (for example, it becomes possible to extend the heated water channel 533 up to a position immediately above the primary water discharge channel 531), thereby being able to favorably heat the valve seat 54 as well as the primary water discharge channel 531. Further, since the valve body 521 seated on the valve seat 54 can be indirectly heated with the heated valve seat 54, the valve body 521 can be prevented from freezing, thereby being able to suppress defective sealing when the valve body 521 is seated.

Furthermore, since the gas and water discharge valve 52 is disposed such that its axis L3 extends in the lateral direction, the overall height of the gas and water discharge unit 50 can be reduced, so that the compact gas and water discharge unit 50 can be realized. In addition, since the unit body 53 is integrally formed with the gas-liquid separator 51 and the gas and water discharge valve 52, a conventional valve body is not needed and the gas and water discharge unit 50 can thus be further downsized. Further, with the elimination of such a conventional valve body, a sealing member or the like for maintaining scalability between the valve body and gas-liquid separator can also be omitted, thereby being able to reduce the cost.

Although the embodiment of the present disclosure has been detailed, the present disclosure is not limited thereto, and various design changes can be made without departing from the spirit and scope of the present disclosure described in the claims. The embodiment of the present disclosure described above is an example in which the heated water channel 533 surrounds both the primary water discharge channel 531 and secondary water discharge channel 532 so as to heat them, but the present disclosure is not limited thereto, and the heated water channel 533 may be configured such that it surrounds at least one of the primary water discharge channel 531 or secondary water discharge channel 532.

Further, in the aforementioned embodiment, the center line L2 of the secondary water discharge channel 532 is offset from the center line L1 of the primary water discharge channel 531, but the primary water discharge channel 531 and secondary water discharge channel 532 may be disposed on a plane defined by the center line L1 of the primary water discharge channel 531 and the center line L2 of the secondary water discharge channel 532. With such a configuration, heated water can flow in parallel onto the defined plane, so that the advantageous effect of further reducing the overall height of the gas and water discharge unit 50 can be expected.

DESCRIPTION OF SYMBOLS

1 Fuel cell system
10 Fuel cell device
20 Oxidant gas supply system
30 Fuel gas supply system
40 Refrigerant supply system
50 Gas and water discharge unit
51 Gas-liquid separator
52 Gas and water discharge valve
53 Unit body
54, 55 Valve seat
56 Heated water inlet tube
57 Heated water outlet tube
521 Valve body
522 Valve shaft
523 Valve chamber
524 Actuator
531 Primary water discharge channel (first channel)
532 Secondary water discharge channel (second channel)
532a Direction conversion channel
533 Heated water channel

What is claimed is:

1. A gas and water discharge unit for a fuel cell system, comprising:
    a gas-liquid separator adapted to separate produced water from a fuel off-gas discharged from a fuel cell device;
    a gas and water discharge valve disposed downstream of the gas-liquid separator; and
    a unit body made of resin, the unit body being integrally formed with the gas-liquid separator and the gas and water discharge valve,
    wherein an inside of the unit body includes a first channel, a second channel, and a heated water channel, the first channel being configured to allow communication between the gas-liquid separator and the gas and water discharge valve and being provided with a valve seat at an end of the first channel on a side of the gas and water discharge valve, the second channel being configured to communicate with the first channel via the gas and water discharge valve, and the heated water channel being configured to surround at least one of the first channel or the second channel.

2. The gas and water discharge unit for a fuel cell system according to claim 1,
    wherein:
    a center line of the second channel is offset from a center line of the first channel, and
    the heated water channel is provided such that the heated water channel surrounds each of the first channel and the second channel.

3. The gas and water discharge unit for a fuel cell system according to claim 1, wherein the gas and water discharge valve is disposed such that its axis extends in a lateral direction.

* * * * *